Sept. 2, 1952  J. H. COOTE ET AL  2,609,291
PHOTOGRAPHIC MULTILAYER STOPPING FILMS
Filed Nov. 26, 1948

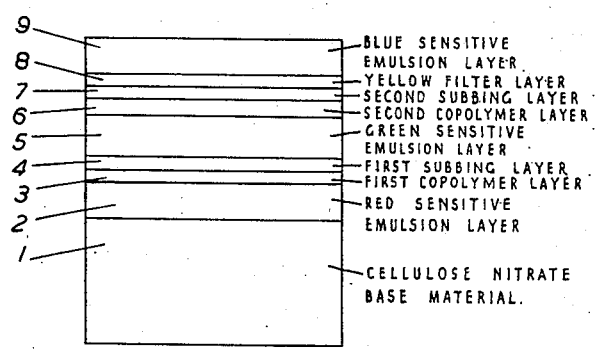

9 — BLUE SENSITIVE EMULSION LAYER
8 — YELLOW FILTER LAYER
7 — SECOND SUBBING LAYER
6 — SECOND COPOLYMER LAYER
5 — GREEN SENSITIVE EMULSION LAYER
4 — FIRST SUBBING LAYER
3 — FIRST COPOLYMER LAYER
2 — RED SENSITIVE EMULSION LAYER
1 — CELLULOSE NITRATE BASE MATERIAL.

Inventors
Jack Howard Coote,
William Harry Gathercole
By
Wenderoth, Lind + Ponack
Attorneys Patented Sept. 2, 1952

2,609,291

UNITED STATES PATENT OFFICE 2,609,291

PHOTOGRAPHIC MULTILAYER STRIPPING FILMS

Jack Howard Coote, London, and William Harry Gathercole, Surrey, England, assignors to Dufay-Chromex Limited, London, England, a British company Application November 26, 1948, Serial No. 62,226
In Great Britain November 28, 1947

7 Claims. (Cl. 95—2)

This invention relates to multi-layer stripping films and to a process for the production thereof. Such films are required when it is desired to transfer one or more of a plurality of colour records produced by a single exposure to separate bases for use in obtaining the corresponding positive records or for use in the copying process described in British patent specification No. 638,308.

For use in motion picture work it is necessary to secure good adhesion between the several layers as well as good overall flexiblity with the minimum thickness of film. It is difficult to secure material fulfilling all these requirements.

Numerous proposals have been made to interpose between silver halide emulsion layers substances of basic or acidic character (usually applied as solutions in organic solvents) and to rely upon the ultimate solution in an aqueous bath of approporiate pH of the basic or acidic substance to permit ready separation of the emulsions with or without a supporting layer. Other proposals have included the application of solutions in organic solvents or even in water of film-forming substances to provide interlayers having adhesive properties.

We have now found that multi-layer stripping film meeting the basic requirements for motion picture work and which can be accurately controlled is obtained when the layer or layers separating the silver halide emulsion layers comprise a copolymer of vinyl chloride and vinyl acetate. The copolymers can be coated from solutions in volatile organic solvents which can be satisfactorily removed at low temperatures. The layers are hydrophobe and resist penetration by aqueous liquors. They also have good overall flexibility and can be coated in thin layers. They can be applied and the solvents evaporated under conditions which do not harm the underlying silver halide emulsion layer or layers.

The present invention provides a multi-layer stripping film comprising a support carrying upon one side thereof at least two silver halide emulsion layers sensitive to different parts of the spectrum, said layers being separated by a layer comprising a hydrophobe copolymer of vinyl chloride and vinyl acetate. Preferably the copolymer employed has a molecular weight of approximately ten thousand and contains about 85-88% of polyvinyl chloride.

According to a feature of the invention the layer comprising the copolymer of vinyl chloride and vinyl acetate also contains interpolymerized therewith a small amount of an aliphatic hydroxy dicarboxylic acid such as malic acid. Usually the amount of acid is between 0.5 and 2.5% by weight.

In carrying out the process of the invention the base material carrying a first silver halide emulsion is coated with a thin layer of a solution in volatile organic solvents of a copylymer of vinyl chloride and vinyl acetate. The following solution may be used:

| | Parts by weight |
|---|---|
| Copolymer A | 16.0 |
| Copolymer B | 16.0 |
| Acetone | 48.0 |
| Benzene | 20.0 |
| | 100.0 |

Copolymer A was a copolymer of vinyl chloride and vinyl acetate having a molecular weight of about ten thousand and containing between 85 and 88% of vinyl chloride. Copolymer B was a similar copolymer which had had interpolymerized therewith 1.5% of malic acid. This layer is coated sufficiently thin that upon drying the resulting coating is not more than one-thousandth of an inch thick, and most desirably, not more than half that thickness. The solvents are evaporated at the lowest possible temperature, preferably using warm air at 70–80° F. The coating is then treated with a subbing layer which is a dilute aqueous solution of gelatine and chrome alum containing a wetting agent. Thereafter the outerlying or second silver halide emulsion layer is coated in the usual manner.

When a three layer material is to be produced the material is again coated with the solution of copolymer, dried as before and then treated, after drying, with a dilute aqueous solution of gelatine and chrome alum containing a wetting agent. It is then coated with the third silver halide emulsion layer.

The copolymer layers are quite impermeable to the usual photographic processing reagents and after a multi-layer film produced as above described has been exposed the individual layers can be developed, the images copied using infrared light as outlined in U. S. Serial No. 42,351 and then stripped off carried upon the copolymer layer. It is not necessary to use special solvents to reduce the adhesion between the layers, which, as laid down, have sufficient adhesion to hold them together during processing of the material as well as the necessary flexibility, but can be readily separated and peeled apart without damaging the underlying emulsion layer.

It has been found quite satisfactory to use a single standard solution of copolymer for the stripping layers when more than one is required.

There will now be described the production of a three colour stripping film in accordance with the invention. This is illustrated in the accompanying drawing.

A cellulose nitrate base 1 carrying a red sensitized silver halide emulsion layer 2 was coated with a thin coating of the solution of copolymers A and B described above. The solvents were gradually removed in a current of warm air, care being taken to keep the temperature of the air below 90° F. and preferably between 70° and 80° F. The resulting layer of copolymer 3 was about five ten-thousandths of an inch thick. After removal of the solvents the surface treated with a subbing solution made up from equal volumes of 1% aqueous solutions of chrome alum and gelatine to which had been added a small quantity of a wetting agent. The subbing layer 4 is then coated with the green sensitive silver halide emulsion layer 5. The emulsion as applied had previously had added to it a small quantity of a wetting agent—about 0.10% by weight based upon the weight of the emulsion has been found to be suitable. The wetting agent is found to assist in spreading the gelatine emulsion.

The green sensitive silver halide emulsion layer 5 is then coated with a thin layer of the same solution of copolymers A and B, the coating being applied in such a quantity as to produce, upon drying, a layer of about five ten-thousandths of an inch thickness. The coating was dried with warm air as before and the resulting layer of copolymer 6 treated with the same subbing solution as that previously employed. The resulting subbing layer 7 is then coated with a layer of gelatine 8 dyed with Chlorazol Brilliant Yellow to serve as a minus blue filter. Finally a blue sensitive silver halide emulsion layer 9 containing a small proportion of wetting agent is coated upon the yellow filter layer.

In an alternative procedure instead of inserting the minus blue filter as a separate layer a yellow dye may be added to the solution of the copolymer of vinyl chloride and vinyl acetate which is applied over the green sensitive silver halide emulsion layer. A suitable dye is Waxoline Yellow IS.

There is thus produced a three colour stripping film in which the outermost and middle emulsion layers can each be stripped off carried upon the underlying copolymer layer. No special chemicals are required to reduce the adhesion between the layers and since the copolymer layers are impermeable to the normal photographic developers, no special arrangements such as accurate timing in the application of the developers are necessary to prevent undue penetration. The material is thus very suitable for copying and stripping off.

We claim:

1. A multi-layer stripping film comprising a support carrying upon one side thereof at least two silver halide emulsion layers sensitive to different parts of the spectrum, said layers being separated by a layer comprising a transparent, flexible, water-insoluble, hydrophobe copolymer of vinyl chloride and vinyl acetate and containing at least 85% of vinyl chloride, the silver halide emulsion layer underlying said copolymer layer adhering directly to said copolymer layer and the silver halide emulsion layer overlying said copolymer layer being attached hereto by a hardened gelatine layer.

2. A multi-layer stripping film comprising a support carrying upon one side thereof at least two silver halide emulsion layers sensitive to different parts of the spectrum, said layers being separated by a layer comprising a transparent, flexible, water-insoluble, hydrophobe copolymer of vinyl chloride and vinyl acetate having a molecular weight of about 10,000 and containing 85%-88% of vinyl chloride, the silver halide emulsion layer underlying said copolymer layer adhering directly to said copolymer layer and the silver halide emulsion layer overlying said copolymer layer being attached thereto by a hardened gelatine layer.

3. A multi-layer stripping film comprising a support carrying upon one side thereof at least two silver halide emulsion layers sensitive to different parts of the spectrum, said layers being separated by a layer comprising a transparent, flexible, water-insoluble, hydrophobe copolymer of vinyl chloride and vinyl acetate having a molecular weight of about 10,000 and containing 85%-88% of vinyl chloride and having interpolymerized therewith 0.5-2.5% by weight of an aliphatic hydroxy dicarboxylic acid, the silver halide emulsion layer underlying said copolymer layer adhering directly to said copolymer layer and the silver halide emulsion layer overlying said copolymer layer being attached thereto by a hardened gelatine layer.

4. A multi-layer stripping film according to claim 3 in which the aliphatic hydroxy dicarboxylic acid is malic acid.

5. A multi-layer stripping film comprising a support carrying upon one side thereof three silver halide emulsion layers, each sensitive to a different part of the spectrum; each adjoining pair of emulsion layers being separated by a layer comprising a transparent, flexible, water-insoluble, hydrophobe copolymer of vinyl chloride and vinyl acetate containing at least 85% of vinyl chloride, the silver halide emulsion layer underlying each of said copolymer layers adhering directly thereto and the silver halide layer overlying each of said copolymer layers being attached thereto by a hardened gelatine layer.

6. A multi-layer stripping film according to claim 5 in which at least one copolymer layer is dyed to act as a light filter.

7. A multi-layer stripping film according to claim 5 in which there is interposed between a copolymer layer and the outer of the silver halide emulsion layers that it separates, a dyed gelatine layer which acts as a light filter.

JACK HOWARD COOTE.
WILLIAM HARRY GATHERCOLE.

REFERENCES CITED

The following references are of record in the file of this patent:

UNITED STATES PATENTS

| Number | Name | Date |
|---|---|---|
| 2,010,188 | Hagedorn et al. | Aug. 6, 1935 |
| 2,167,732 | Verkinderen | Aug. 1, 1939 |
| 2,182,814 | Marasco | Dec. 12, 1939 |
| 2,293,816 | Glafkides | Aug. 25, 1942 |
| 2,415,442 | Rackett | Feb. 11, 1947 |
| 2,448,552 | Schulze | Sept. 7, 1948 |